(12) United States Patent
Pilkington

(10) Patent No.: US 8,176,117 B2
(45) Date of Patent: May 8, 2012

(54) ACCELERATOR FOR OBJECT-ORIENTED COMMUNICATIONS AND METHOD

(75) Inventor: Charles E. Pilkington, Ottawa (CA)

(73) Assignee: STMicroelectronics, Inc., Carrollton, TX (US)

( * ) Notice: Subject to any disclaimer, the term of this patent is extended or adjusted under 35 U.S.C. 154(b) by 1247 days.

(21) Appl. No.: 10/970,488

(22) Filed: Oct. 21, 2004

(65) Prior Publication Data

US 2005/0138130 A1    Jun. 23, 2005

Related U.S. Application Data

(60) Provisional application No. 60/531,535, filed on Dec. 19, 2003, provisional application No. 60/531,464, filed on Dec. 19, 2003.

(51) Int. Cl.
*G06F 15/16* (2006.01)

(52) U.S. Cl. ......... 709/203; 709/231; 709/217; 709/220

(58) Field of Classification Search ............ 709/203, 709/217, 220, 231
See application file for complete search history.

(56) References Cited

U.S. PATENT DOCUMENTS

| | | | |
|---|---|---|---|
| 6,289,343 B1 * | 9/2001 | Freund et al. .................. 1/1 |
| 2002/0019985 A1 * | 2/2002 | Fuccello et al. .............. 725/133 |
| 2002/0116545 A1 * | 8/2002 | Mandato et al. .............. 709/328 |
| 2003/0028389 A1 * | 2/2003 | Casati et al. ...................... 705/1 |
| 2004/0098526 A1 * | 5/2004 | Matsumoto et al. .......... 710/240 |
| 2005/0149612 A1 * | 7/2005 | Messinger et al. ............ 709/200 |

OTHER PUBLICATIONS

Douglas C. SChmidt et al. "The Deesign of the TAO Real Time Object Request Brokr," Oct. 11, 1997, pp. 1-28.*
Douglas C. Schmidt, The Design of the TAO Real-Time Object Request Broker, Jan. 18, 1999, 1-46 pages.*
Schmidt, "The design of the TOA Real Time Object Request Broker" Jan. 1997, 28 pages.*
Douglas C. Schmidt et al., "The Design of the TAO Real-Time Object Request Broker," Oct. 11, 1997, pp. 1-28.
Douglas C. Schmidt, "Evaluating Architectures for Multithreaded Object Request Brokers," Communications of the ACM, vol. 41, No. 10, Oct. 1998, pp. 54-60.
Stephen S. Yau et al., Reconfigurable Context-Sensitive Middleware for Pervasive Computing, Pervasive Computing, 2002 IEEE, pp. 33-40.
Henning Coors et al., "Hardware/Software Co-Design for IP Objects Based on CORBA," 1999 IEEE, pp. 63-68.

* cited by examiner

*Primary Examiner* — Jeffrey Pwu
*Assistant Examiner* — Sulaiman Nooristany

(57) ABSTRACT

A processing system includes a plurality of processing resources capable of executing a plurality of objects. The objects include a client object and one or more server objects. The client object is capable of requesting a service provided by at least one of the one or more server objects. The processing system also includes at least one hardware engine capable of receiving a request for the service from the processing resource executing the client object, formatting one or more messages associated with the requested service, and communicating the one or more messages to the processing resource executing at least one of the one or more server objects that provides the requested service.

31 Claims, 10 Drawing Sheets

ACCELERATOR FOR OBJECT-ORIENTED COMMUNICATIONS AND METHOD

CROSS REFERENCE TO RELATED APPLICATIONS

This patent application claims priority under 35 U.S.C. §119(e) to the following U.S. Provisional Patent Applications:
Ser. No. 60/531,535 filed on Dec. 19, 2003; and
Ser. No. 60/531,464 filed on Dec. 19, 2003;
which are hereby incorporated by reference.

This patent application is related to U.S. patent application Ser. No. 10/970,295 entitled "OBJECT REQUEST BROKER FOR ACCELERATING OBJECT-ORIENTED COMMUNICATIONS AND METHOD" filed on Oct. 1, 2004, which is hereby incorporated by reference.

TECHNICAL FIELD

This disclosure is generally directed to processing systems and more specifically to an accelerator for object-oriented communications and method.

BACKGROUND

Multi-processor computing systems are becoming more and more popular for use in applications that require large amounts of processing power. In conventional multi-processor systems, multiple processors are used to perform tasks or processes in parallel. This allows, for example, the processors to execute different portions or "threads" of an application at the same time. Also, additional processors may be added to improve the performance of the computer system and to execute additional threads.

Many of the applications executed by conventional processor systems are implemented using object-oriented programming techniques. A problem with conventional multi-processor systems is that communications between objects are typically slow. This often reduces the performance of the processing systems.

SUMMARY

This disclosure provides an accelerator for object-oriented communications and method.

In one aspect, a processing system includes a plurality of processing resources capable of executing a plurality of objects. The objects include a client object and one or more server objects. The client object is capable of requesting a service provided by at least one of the one or more server objects. The processing system also includes at least one hardware engine capable of receiving a request for the service from the processing resource executing the client object, formatting one or more messages associated with the requested service, and communicating the one or more messages to the processing resource executing at least one of the one or more server objects that provides the requested service.

In particular aspects, the at least one hardware engine includes a formatter capable of formatting the one or more messages. The formatter may include a command decoder capable of decoding the request, a data compactor capable of placing decoded information into one or more packets, and a network request generator capable of generating the one or more messages using the one or more packets. The formatter may also include a network response decoder capable of decoding result information associated with the requested service contained in one or more packets, a data extractor capable of extracting the result information from the one or more packets, and an acknowledgement generator capable of providing the result information to the processing resource executing the client object.

In another aspect, a method includes executing a plurality of objects at a plurality of processing resources. The objects include a client object and one or more server objects. The client object is capable of requesting a service provided by at least one of the one or more server objects. The method also includes providing a request for the service from the processing resource executing the client object to a hardware engine. The method further includes formatting one or more messages associated with the requested service using the hardware engine. In addition, the method includes communicating the one or more messages to the processing resource executing at least one of the one or more server objects that provides the requested service.

In yet another aspect, a hardware engine includes a command decoder capable of decoding a request for a service received from a client object executed by a processing resource. The service is provided by one or more server objects executed by at least one other processing resource. The hardware engine also includes a data compactor capable of placing decoded information into one or more packets. In addition, the hardware engine includes a network request generator capable of generating one or more messages using the one or more packets. The one or more messages are capable of invoking the requested service.

In still another aspect, an apparatus includes at least one of an input device and an interface to the input device. The input device is capable of providing input data. The apparatus also includes at least one of an output device and an interface to the output device. The output device is capable of receiving output data. In addition, the apparatus includes a processing system capable of receiving the input data and generating the output data. The processing system includes a plurality of processing resources capable of executing a plurality of objects. The objects include a client object and one or more server objects. The client object is capable of requesting a service provided by at least one of the one or more server objects. The processing system also includes at least one hardware engine capable of receiving a request from the client object for the service, formatting one or more messages associated with the requested service, and communicating the one or more messages to the processing resource executing at least one of the one or more server objects that provides the requested service.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
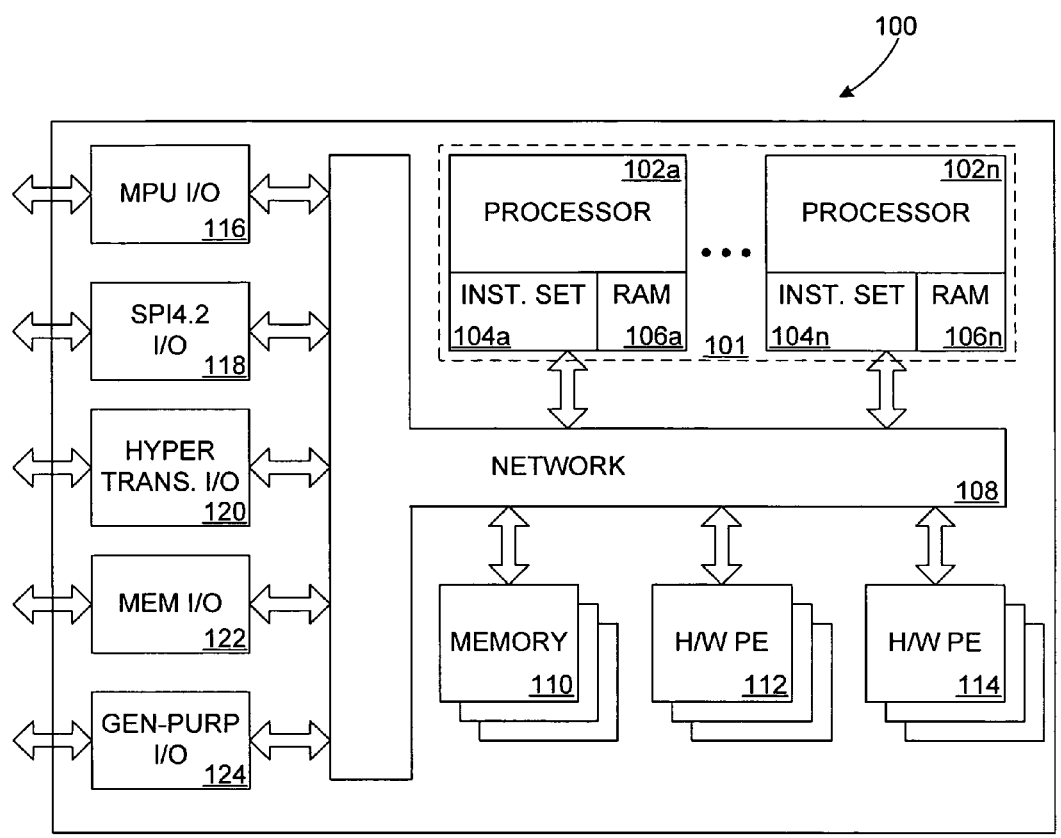
FIG. 1 illustrates an example processing system according to one embodiment of this disclosure.

FIG. 1 illustrates an example processing system 100 according to one embodiment of this disclosure. The embodiment of the processing system 100 shown in FIG. 1 is for illustration only. Other embodiments of the processing system 100 may be used without departing from the scope of this disclosure.

In this example embodiment, the processing system 100 includes a processor core 101 having multiple processors 102a-102n. The processors 102a-102n represent any suitable processing devices, such as reduced instruction set computer ("RISC") processors. As a particular example, the processors 102a-102n may represent hardware multithreaded processors having separate register banks for different threads. As another particular example, the processors 102a-102n may represent homogenous processors configured in a symmetric multi-processing ("SMP") arrangement. As yet another particular example, the processors 102a-102n may represent heterogeneous processors.

In this example, the processors 102a-102n include customized instruction sets 104a-102n. Each of the customized instruction sets 104a-104n allows one of the processors 102a-102n to operate according to a particular set of instructions. For example, the customized instruction sets 104a-102n could be configured to allow the processors 102a-102n to operate in a particular environment. Each of the customized instruction sets 104a-102n could be implemented in any suitable manner, such as by using an application specific integrated circuit ("ASIC") implemented in one or more of the last metal layers of the processors 102a-102n. At least some of the customized instruction sets 104a-102n could represent the same instruction set, or all of the customized instruction sets 104a-102n could represent different instruction sets. In this document, the term "each" refers to every of at least a subset of the identified items.

The processors 102a-102n also include one or more embedded memories, such as random access memories ("RAM") 106a-106n. The random access memories 106a-106n are used to store any suitable information used by the processors 102a-102n, such as data and instructions executed by the processors 102a-102n. Each of the random access memories 106a-106n could represent any suitable amount of memory. Also, other types of embedded memories, such as read only memories ("ROM"), could be used in the processors 102a-102n.

In the illustrated embodiment, the processors 102a-102n are coupled to a network 108. In this document, the term "couple" and its derivatives refer to any direct or indirect communication between two or more elements, whether or not those elements are in physical contact with one another. The network 108 facilitates communication of information between various components of the processing system 100. For example, the network 108 allows the processors 102a-102n to retrieve instructions to be executed by the processors 102a-102n and data to be used during execution of the instructions. In some embodiments, the processing system 100 represents a "system on a chip" ("SoC"), and the network 108 represents a "network on a chip" ("NoC").

In this example, the network 108 is coupled to one or more memories 110, one or more hardware processing engines ("PE") 112, and one or more additional hardware processing engines 114. The memories 110 represent one or more memories capable of storing information used by the processing system 100. The memories 110 could represent a single type of memory or multiple types of memory, such as random access memory, read only memory, flash memory, programmable read only memory, and/or other or additional types of memory.

The hardware processing engines 112, 114 represent programmable hardware that may be customized according to particular needs. For example, the hardware processing engines 112, 114 may be programmed for use in particular applications or particular environments. The hardware processing engines 112, 114 could be programmed to perform any of a wide variety of functions. The hardware processing engines 112, 114 represent any suitable structures capable of providing customized or programmable functionality. As particular examples, the hardware processing engines 112 could be implemented using ASICs or Sea of Gates ("SoG") structures, and the hardware processing engines 114 could be implemented using field programmable gate arrays ("FPGA"). While FIG. 1 illustrates the use of both hardware processing engines 112 and 114, any number of different types of hardware processing engines (including a single type) could be used in the processing system 100.

In the illustrated example, the network 108 is also coupled to multiple interfaces 116-124. The interfaces 116-124 allow the processing system 100 to communicate with various external devices, such as external memories or peripheral devices. As shown in FIG. 1, a micro-processing unit ("MPU") interface 116 facilitates communication with an external micro-processing unit. A System Packet Interface Level 4, Phase 2 ("SPI4.2") interface 118 allows the processing system 100 to communicate using multiple communication protocols and variable data rates through a common system-level interface standard. A hyper transport interface 120 facilitates high bandwidth, chip-to-chip communications. A memory interface 122 allows communication with an external memory, such as a quad data rate ("QDR") memory. A general-purpose interface 124 allows other communications to and from the processing system 100. These represent some of the interfaces that may be used in the processing system 100. Other or additional interfaces, such as an interface to a co-processor or an application-specific interface, could also be used in the processing system 100.

The various components in the processing system 100 may communicate over the network 108 using any suitable protocol or protocols. In some embodiments, the components in the processing system 100 communicate with the network 108 using a standardized protocol. As a particular example, hardware wrappers may be used to convert between an internal data format used by the hardware processing engines 112, 114 or other components and a packet-oriented format used by the network 108.

In one aspect of operation, the processing system 100 includes one or more components that help to accelerate communications between objects executed by the various processing resources (processors 102a-102n and hardware processing engines 112, 114) in the system. For example, applications executed by the processing system 100 may be implemented using object-oriented programming, and the components facilitate faster communication between the objects used to implement the applications. As particular examples, at least one of the processors 102a-102n or other processing resources may have access (either internally or externally) to a wire engine, which helps to facilitate faster communications between objects. Also, the processing resources in the processing system 100 may communicate with an object request broker, which also helps to facilitate faster communications between objects. Through the use of the wire engine(s) and/or the object request broker, the performance of the processing system 100 may increase.

While this document may describe a processing system 100 that implements both one or more wire engines and an object request broker, only one of these features could be implemented in a processing system. For example, a processing system could implement only the wire engine(s) without implementing the object request broker. Similarly, a processing system could implement only the object request broker without implementing the wire engine(s).

Although FIG. 1 illustrates one example of a processing system 100, various changes may be made to FIG. 1. For example, the processing system 100 could include any number and type of processors and any number and type of hardware processing engines. The processing system 100 could also include any number and type of interfaces to external devices. In addition, while the processing system 100 has been described as possibly representing a "system on a chip," the processing system 100 could be implemented using any suitable number of chips or other structures.

Figure 2:
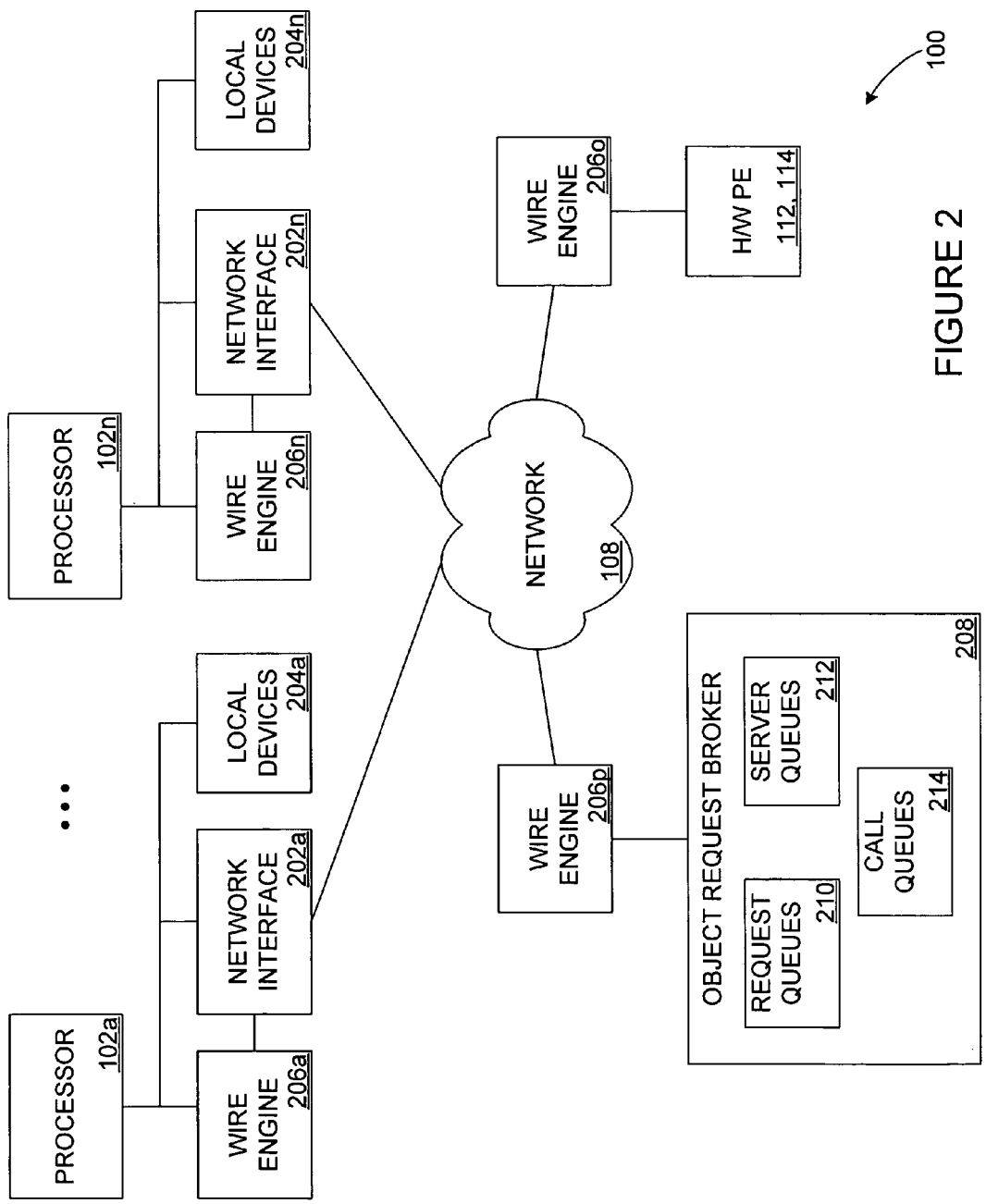
FIG. 2 illustrates additional details of an example processing system according to one embodiment of this disclosure.

FIG. 2 illustrates additional details of an example processing system 100 according to one embodiment of this disclosure. The embodiment of the processing system 100 shown in FIG. 2 is for illustration only. Other embodiments of the processing system 100 may be used without departing from the scope of this disclosure.

As shown in FIG. 2, the processors 102a-102n are coupled to network interfaces 202a-202n, respectively. The network interfaces 202a-202n facilitate communication between the processors 102a-102n and a network, such as the network 108. The network interfaces 202a-202n may represent any suitable interface for communicating over a network.

The processors 102a-102n are also coupled to other local devices 204a-204n. The other local devices 204a-204n represent any suitable devices that may be integrated into the processing system 100 and used by the processors 102a-102n. For example, the other local devices 204a-204n could represent co-processors or hardware accelerators. The other local devices 204a-204n could also represent memories, such as internal caches, or any other or additional devices.

In this example, the processors 102a-102n are further coupled to wire engines 206a-206n respectively. The wire engines 206a-206n are also coupled to the network interfaces 202a-202n, respectively. The wire engines 206a-206n represent hardware devices that accelerate object-oriented communications in the processing system 100.

In some embodiments, object-oriented communications involve one object (referred to as a "client" object) invoking a service provided by another object (referred to as a "server" object). The server object appears as a "remote" object to the client object, and the client object appears as a "remote" object to the server object. The wire engines 206a-206n may set up the invocation of a service provided by a server object, provide arguments or parameters for the service from the client object to the server object, receive results from the server object, provide the results to the client object, and terminate the communication. The wire engines 206a-206n may also translate data representations between a processor-specific representation and a network standard representation. The wire engines 206a-206n may further manage buffers and control the network interfaces 202a-202n, such as by blocking and formatting data transfer requests. In addition, each of the processors 102a-102n may execute multiple threads, and the wire engines 206a-206n may arbitrate between multiple threads that are attempting to perform calls to remote objects in parallel.

As shown in FIG. 2, the wire engines 206a-206n are coupled to the network interfaces 202a-202n. This allows the wire engines 206a-206n to access the network 108 independent of the processors 102a-102n. For example, this may allow the wire engines 206a-206n to perform read and write operations independent of the processors 102a-102n. Moreover, the wire engines 206a-206n could perform the read and write operations in parallel with the processors 102a-102n. In addition, the wire engines 206a-206n act as interfaces to the processors 102a-102n, while details of the network interfaces 202a-202n are not visible at the interfaces to the processors 102a-102n. This may allow the wire engines 206a-206n to be configured in a wide variety of ways without requiring associated changes to be made to the software executed by the processors 102a-102n.

While FIG. 2 illustrates the wire engines 206a-206n as separate components from the processors 102a-102n, one, some, or all of the wire engines 206a-206n could reside inside or outside of the processors 102a-102n, respectively. For example, the wire engines 206a-206n could represent co-processors that are coupled to the processors 102a-102n. As a particular example, the wire engines 206a-206n could represent co-processors having memory-mapped interfaces. In other embodiments, the wire engines 206a-206n could represent integrated execution units inside the processors 102a-102n. As a particular example, each of the integrated execution units could have dedicated registers or other memory that is part of the associated processor's instruction set architecture ("ISA").

Each of the wire engines 206a-206n may include any structure(s) for generating or otherwise formatting messages for objects. For example, the wire engines 206a-206n could include ASICs, FPGAs, or Sea of Gates structures.

In the illustrated example, an object request broker 208 is coupled to the network 108. The object request broker 208 represents another hardware device that accelerates object-oriented communications in the processing system 100. In particular, the object request broker 208 brokers the communications that occur between the objects in the processing system 100.

The object request broker 208 may perform a wide variety of tasks to broker communications between the client objects and the server objects. For example, the object request broker 208 may manage the various phases of communications between the client and server objects. This may include managing the initial connection, the transfer of data from the client object to the server object, the transfer of results from the server object to the client object, and the termination of the connection. The object request broker 208 may also perform load balancing to balance requests from client objects over a pool of server objects. This allows, for example, server "farms" composed on multiple server objects to provide the same service. The load balancing performed by the object request broker 208 may be based on any suitable criteria, such as latency, throughput, power consumption, network utilization, and quality of service requirements. In addition, the object request broker 208 may provide scheduling, flow control, and buffering.

When performing the scheduling operations, the object request broker 208 could use the dynamic status of the processing system 100. For example, the object request broker 208 could use the status of the network 108 to identify which services should be provided in the processing system 100 and which services should be denied or delayed. As a particular example, the object request broker 208 could determine that the network 108 is becoming congested. The object request broker 208 could then avoid sending messages to server objects located in congested areas of the network 108. As another particular example, the object request broker 208 could use flow control mechanisms, such as by delaying acknowledgement messages, to delay lower-priority communications when the network 108 is congested.

In some embodiments, a client object is implemented by one of the processing resources in the system 100, and a server object is implemented by another of the processing resources. These two objects communicate using messages that pass through the object request broker 208. In particular embodiments, the messages are specially formatted messages that are generated or otherwise formatted by the wire engines associated with those processing resources. However, other embodiments that do not involve the wire engines 206a-206n could also be used.

In the illustrated example, the object request broker 208 includes various queues 210-214. The queues 210-214 store information used by the object request broker 208 to broker messages between objects in the processing system 100. For example, the object request broker 208 may maintain a request queue 210 for each service offered by the server objects. The request queue 210 for a particular service stores the requests from client objects involving that service. A request queue 210 could represent a first-in, first-out ("FIFO") queue, a prioritized FIFO or other queue, or any other suitable type of queue. The request queues 210 allow multiple client objects to request the same service, and the object request broker 208 may handle these requests using any suitable scheduling technique.

The object request broker 208 may also maintain a server queue 212 for each service offered by the server objects. The server queue 212 for a particular service stores the identity of the server object(s) that provide the particular service. A server queue 212 could, for example, represent a FIFO queue where the order of the server objects is based on the time that the objects announced the availability of the service. The server queues 212 allow multiple server objects to provide the same service, and the object request broker 208 may select one of the server objects to handle a particular request from a client object.

In addition, the object request broker 208 may maintain a call queue 214 for each connection between objects that is handled by the object request broker 208. The call queue 214 for a particular connection stores the various information transmitted between the client and server objects for that connection. For example, the call queue 214 could temporarily store service parameters sent from the client object to the server object and results sent from the server object to the client object. In particular embodiments, the object request broker 208 uses thread identifiers associated with the various threads executed by the processors 102a-102n to associate each message with a particular one of the call queues 214.

The object request broker 208 is capable of using any suitable information to select a server object to provide a requested service. Examples of the information used could include an availability of the server objects, a system power measurement, a system power budget, a quality of service requirement, a request priority, a task deadline, utilization of a network coupling the processing resources, utilization of the processing resources executing the server objects, throughput of the processing resources executing the server objects, and latency of the processing resources executing the server objects. Moreover, the object request broker 208 could implement fault tolerance by dispatching requests for service to server objects that are known to be operational.

The object request broker 208 may include any structure(s) for brokering requests between objects. For example, the object request broker 208 could include an ASIC, FPGA, or Sea of Gate architecture.

As shown in FIG. 2, one of the hardware processing engines 112, 114 is coupled to the network 108 by a wire engine 206o, and the object request broker 208 is coupled to the network 108 by a wire engine 206p. As with the wire engines 206a-206n the wire engines 206o-206p help to accelerate communications between objects in the processing system 100. For example, the wire engines 206a-206o may communicate messages to and receive messages from the wire engine 206p. In particular embodiments, the wire engines 206a-206o operate in master mode, and the wire engine 206p operates in slave mode. Also, as with the wire engines 206a-206n the wire engines 206o-206p may or may not form part of the hardware processing engine 112, 114 and the object request broker 208, respectively. Each of the wire engines 206o-206p may include any structure(s) for generating or otherwise formatting messages for objects.

In one aspect of operation, a server object implemented by one of the processors 102a-102n or one of the hardware processing engines 112, 114 initiates a message to the object request broker 208. The message identifies the service or services that the server object provides and the parameters for each service (such as power usage, average execution time, and standard deviation of execution time). The wire engine associated with the processing resource executing the server object generates or otherwise formats the message and communicates the message to the object request broker 208. The object request broker 208 receives the message through the wire engine 206p and uses the information to identify the server object and the service(s) provided by the server object.

A client object may wish to request a service from one of the server objects in the processing system 100. The client object then initiates a "remote object call," which represents a call used to invoke an object that is remote from the calling object. The remote object call may be divided into multiple stages or phases, such as an invocation or opening phase, a parameter-passing phase, a result-passing phase, and a termination or closing phase.

As part of the remote object call, the wire engine associated with the processing resource implementing the client object generates or otherwise formats a message for the object request broker 208. The message identifies the type of service requested and optionally includes any parameters (such as a priority and quality of service) for the requested service. The requested service and parameters could be encoded in the message. As an example, the requested service could be represented by a single numerical identifier uniquely associated with the service.

The object request broker 208 receives the message from the client object through the wire engine 206p and selects a server object to provide the requested service. This may include, for example, the object request broker 208 performing load balancing to balance the load placed on multiple server objects that could provide the requested service. Once the object request broker 208 selects a server object, the object request broker 208 forwards the message from the client object to the selected server object through the wire engine 206p. If multiple packets or messages are needed to communicate all required information from the client object, the object request broker 208 forwards these messages to the selected server object.

The selected server object receives the message(s) through its associated wire engine, identifies any necessary parameters for the requested service, and performs the requested service. After the server object has performed the service, the server object communicates one or more messages containing the results to the object request broker 208. The object request broker 208 then forwards these messages to the client object. Once the server object has communicated all of the results to the object request broker 208, the server object sends a message to the object request broker 208 indicating that the remote object call is complete.

In this way, the wire engines 206a-206p and/or the object request broker 208 help to facilitate communications between objects in the processing system 100. Moreover, because the wire engines 206a-206p and/or the object request broker 208 are implemented in hardware, the communications between objects may occur more quickly in the processing system 100.

Although FIG. 2 illustrates additional details of one example of a processing system 100, various changes may be made to FIG. 2. For example, the processing system 100 could include any number of processors, network interfaces, local devices, wire engines, and hardware processing engines. Also, in other embodiments, the processing system 100 could include either one or more of the wire engines 206a-206p or the object request broker 208.

Figure 3:
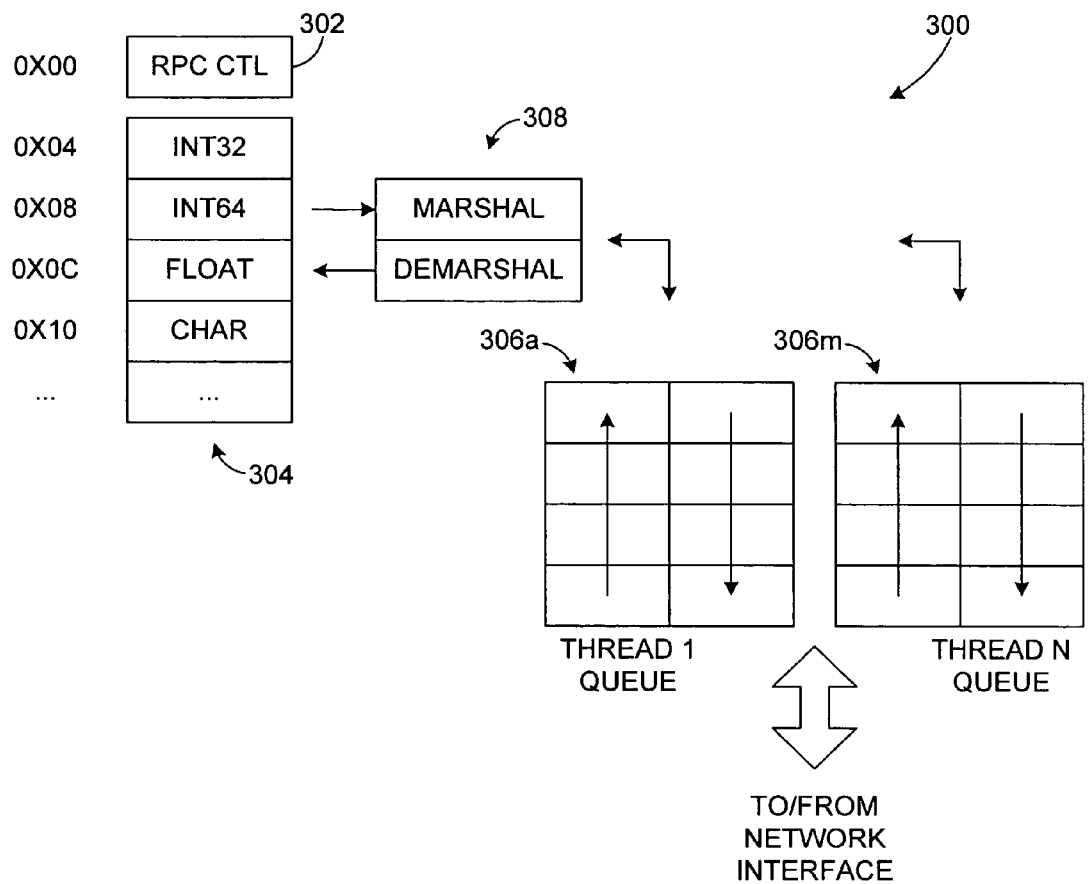
FIG. 3 illustrates a portion of an example memory arrangement in a wire engine for accelerating object-oriented communications according to one embodiment of this disclosure.

FIG. 3 illustrates a portion of an example memory arrangement 300 in a wire engine for accelerating object-oriented communications according to one embodiment of this disclosure. The embodiment of the memory arrangement 300 shown in FIG. 3 is for illustration only. Other embodiments of the memory arrangement 300 may be used without departing from the scope of this disclosure. Also, for ease of explanation, the memory arrangement 300 is described as operating in the wire engine 206a of the processing system 100 shown in FIGS. 1 and 2. The memory arrangement 300 could be used in any other suitable environment.

The following description describes the use of "registers" in the memory arrangement 300. However, other types of memory may be used in the memory arrangement 300 to store the information described below.

As shown in FIG. 3, the memory arrangement 300 includes various control and configuration registers and buffers used to transmit and receive data. The configuration registers are used to store operating parameters of the wire engine 206a, such as an optimal data block size for network transactions. The control registers are used to identify the current phase of a remote object call and the data associated with the phases.

In this example, the memory arrangement 300 includes one or more Remote Procedure Call ("RPC") control registers 302 and multiple data type registers 304. The control registers 302 store control information, such as the optimal data block size. The control registers 302 also store information identifying the current phase of a remote object call.

The data type registers 304 store information associated with the remote object call, such as the parameters sent from a client object to a server object and the results from the server object. In particular embodiments, one or more of the data type registers 304 may be reserved for each data type used by the wire engine 206a. For example, the data type registers 304 could include registers for storing integers of various sizes (such as 8, 16, 32, and 64 bits) and various signed representations (such as unsigned and two's complement representations). The data type registers 304 could also include registers for storing Unicode and American Standard Code for Information Interchange ("ASCII") characters. In addition, the data type registers 304 could include registers for storing floating point values of various sizes (such as 32, 64, and 128 bits).

The memory arrangement 300 also includes one or more buffers 306a-306m. The buffers 306a-306m facilitate communication over the network 108 through the network interface 202a. For example, some of the buffers 306a-306m store information to be communicated over the network 108 until the information can be retrieved and sent by the network interface 202a. Others of the buffers 306a-306m store information received through the network interface 202a until the information is processed by the wire engine 206a. The buffers 306a-306m represent any suitable structure(s) capable of storing and facilitating retrieval of information.

In some embodiments, the processor 102a represents a multithreaded processor capable of executing multiple threads. In particular embodiments, each one of the buffers 306a-306m is associated with one of the threads. Moreover, the same thread may use multiple buffers. For example, a thread could be associated with four different buffers, one buffer each for receiving data from a client object, transmitting data to a client object, receiving data from a server object, and transmitting data to a server object. Any other suitable number of buffers could be used. As an example, remote object calls include two general phases (transfer data from client object to server object and transfer results from server object to client object). Because of this, the buffers for a particular thread could be reused in the phases, such as when one buffer is used to transmit data and another buffer is used to receive data. Also, the various buffers could be implemented in any number of physical units, including a single physical unit.

To support the use of threads in the processor 102a, the wire engine 206a may maintain information identifying the current phase for each of the threads in the registers 302. Also, communications between the processor 102a and the wire engine 206a could include a tag identifying the specific thread associated with the communication. This allows the wire engine 206a to update the appropriate control register 302. This also allows the threads to operate without concern for the operations of the other threads.

In this example, the memory arrangement 300 further includes a marshalling/demarshalling engine 308. The engine 308 is responsible for translating between the data representation(s) used by the processor 102a and the network standard representation used by the network 108. For example, the engine 308 could translate the binary representation of a data value from the processor 102a into a standard binary representation used by the network 108. The engine 308 could also translate the standard binary representation of a data value received over the network 108 into a binary representation used by the processor 102a.

As described above, the control registers 302 store information identifying the current phase of a remote object call. The various phases could include the start of a client invoked remote object call, the start of a server invoked remote object call, the end of the transmission of arguments from a client object to a server object, the end of the server object fetching the arguments, the start of the server object transmitting results, and the termination of the remote object call. Each of these phases may have data associated with it, such as when the call setup phase has an associated service identifier identifying a requested service.

In some embodiments, information is transferred between the client and server objects during a remote object call by reading from and writing to the data type registers 304 in the wire engine 206a. For example, a client object may pass a 32-bit floating point parameter to the server object by writing the parameter into the data type register 304 that holds 32-bit floating point values. The server object then retrieves the parameter by reading from that data type register 304.

In particular embodiments, a write operation into a register 304 triggers various actions by the wire engine 206a. For example, a binary representation of the associated data type may be converted from a representation used by the processor 102a into a standard network representation. The standard network representation is then appended to the buffer containing outgoing data. Once the buffer reaches an optimal transmission length, the data is transferred to the network interface 202a for communication over the network 108 to the object request broker 208.

Similarly, a read operation from a register 304 triggers various actions by the wire engine 206a. For example, if a buffer containing incoming data does not contain enough data to complete the read operation, a network read transaction is initiated. The binary value representing the data is read from the buffer, where the binary value is in the standard network representation. The wire engine 206a converts the binary value into the representation used by the processor 102a, and the value is provided to the processor 102a.

Various techniques may be used to perform synchronization and flow control by the wire engine 206a during read and write operations. For example, the wire engine 206a could stall memory access (read and write) requests until a suitable time. Also, the control registers in the wire engine 206a could indicate that a memory access request would be blocked, and the processor 102a could wait until the operation is capable of being performed. As a particular example, the client object may attempt to read a result from the server object before the server object has provided the result. The read request from the client object could be blocked until the result from the server object is received. At that point, the read operation may occur. In addition, the wire engine 206a could generate an interrupt when a requested operation can proceed or a memory exception if it is not ready to perform a read or write operation.

In some embodiments, a server object may perform delegation, meaning that one server object may invoke another server object or objects in response to a remote object call from a client object. For example, a first server object may receive a request from a client object. The client object's wire engine provides the arguments to the first server object's wire engine. The first server object reads arguments from one or more registers 304 in the server object's wire engine and indicates that it has completed reading the arguments. The first server object then initiates another remote object call, this call involving a second server object. The first server object provides any necessary arguments by writing to one or more registers 304 in its wire engine and then indicates that the first server object has completed its transmission. The second server object retrieves and uses the arguments and generates results, which are stored in the register(s) 304 of its wire engine. The first server object reads the results from the second server object's wire engine and possibly performs additional processing. The first server object then indicates that it is preparing to provide results to the client object. The first server object writes its results in the register(s) 304 of the client object's wire engine and terminates the first remote object call. The client object then reads the results from the registers 304 in its wire engine. In this way, the wire engines support nested remote object calls.

Although FIG. 3 illustrates one example of a portion of a memory arrangement 300 in a wire engine 206a for accelerating object-oriented communications, various changes may be made to FIG. 3. For example, the memory arrangement 300 could include any suitable number of registers 302, 304 and any suitable number of buffers 306. Also, other memory structures could be used in the wire engine 206a.

Figure 4A:
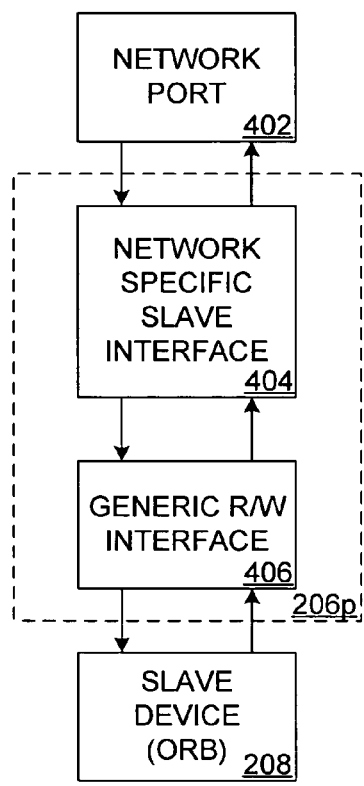
FIGS. 4A and 4B illustrate example wire engines for accelerating object-oriented communications in a processing system according to one embodiment of this disclosure.
Figure 4B:
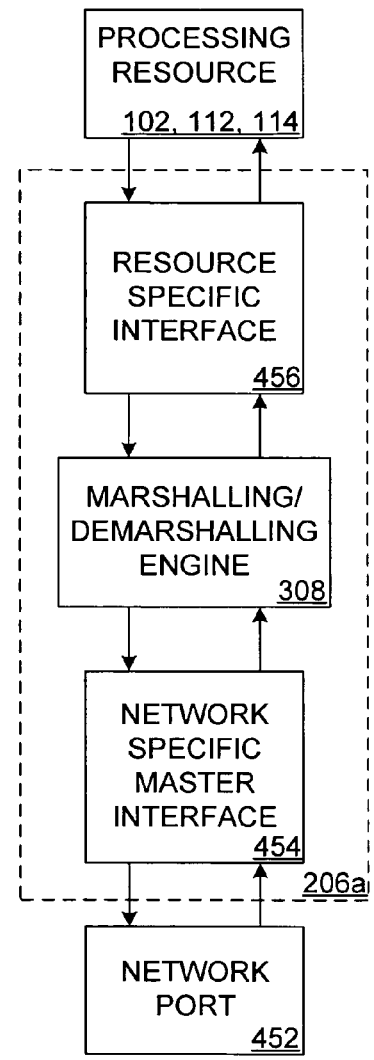

FIGS. 4A and 4B illustrate example wire engines for accelerating object-oriented communications in a processing system according to one embodiment of this disclosure. In particular, FIG. 4A illustrates a wire engine 206p used to interface the object request broker 208 and the network 108, and FIG. 4B illustrates a wire engine 206a used to interface the processor 102a and the network 108. The wire engines 206p, 206a shown in FIGS. 4A and 4B are for illustration only. Other embodiments of the wire engines may be used without departing from the scope of this disclosure.

In FIG. 4A, the wire engine 206p is coupled to the network 108 through a network port 402. The network port 402 represents any suitable structure capable of coupling the wire engine 206p to the network 108.

In this example, the wire engine 206p includes a network specific slave interface 404 and a generic read/write interface 406. The network specific slave interface 404 represents an interface that allows the wire engine 206p to receive information over the network 108 and to communicate information over the network 108 in slave mode. For example, the network specific slave interface 404 may implement a specific protocol used by the network 108. The network specific slave interface 404 represents any suitable structure capable of implementing a network-specific protocol and operating in slave mode.

The generic read/write interface 406 represents an interface that allows various read and write operations to occur involving the object request broker 208. In particular embodiments, the object request broker 208 is accessed by reading from and/or writing to addresses in an address space associated with the object request broker 208. In these embodiments, the generic read/write interface 406 allows the read and write operations to occur in the memory space associated with the generic read/write interface 406. The generic read/write interface 406 represents any suitable structure capable of supporting read and write operations.

In FIG. 4B, the wire engine 206a is coupled to the network 108 through a network port 452. The wire engine 206a includes a network specific master interface 454 and a resource specific interface 456. The network specific master interface 454 represents an interface that allows the wire engine 206a to receive information over the network 108 and to communicate information over the network 108 in master mode. For example, the network specific master interface 454 may implement a specific protocol used by the network 108. The network specific master interface 454 represents any suitable structure capable of implementing a network-specific protocol and operating in master mode.

The resource specific interface 456 represents an interface that allows the wire engine 206a to communicate with a processing resource (processor 102a). For example, the resource specific interface 456 could support the specific protocol used by the processor 102a. The resource specific interface 456 represents any suitable structure capable of supporting communication with a processing resource in the processing system 100.

The wire engine 206a further includes the marshalling/demarshalling engine 308. As explained above, the engine 308 is responsible for translating between the data representation(s) used by the processing resource coupled to the resource specific interface 456 and the network standard representation used by the network 108 coupled to the network specific master interface 454. One embodiment of the marshalling/demarshalling engine 308 is shown in FIG. 5, which is described below.

Although FIGS. 4A and 4B illustrate examples of wire engines for accelerating object-oriented communications in a processing system, various changes may be made to FIGS. 4A and 4B. For example, the same or similar structure for wire engine 206a could also be used as the wire engines 206b-206o in FIG. 2. Also, other embodiments using other types of interfaces or other components could also be used.

Figure 5:
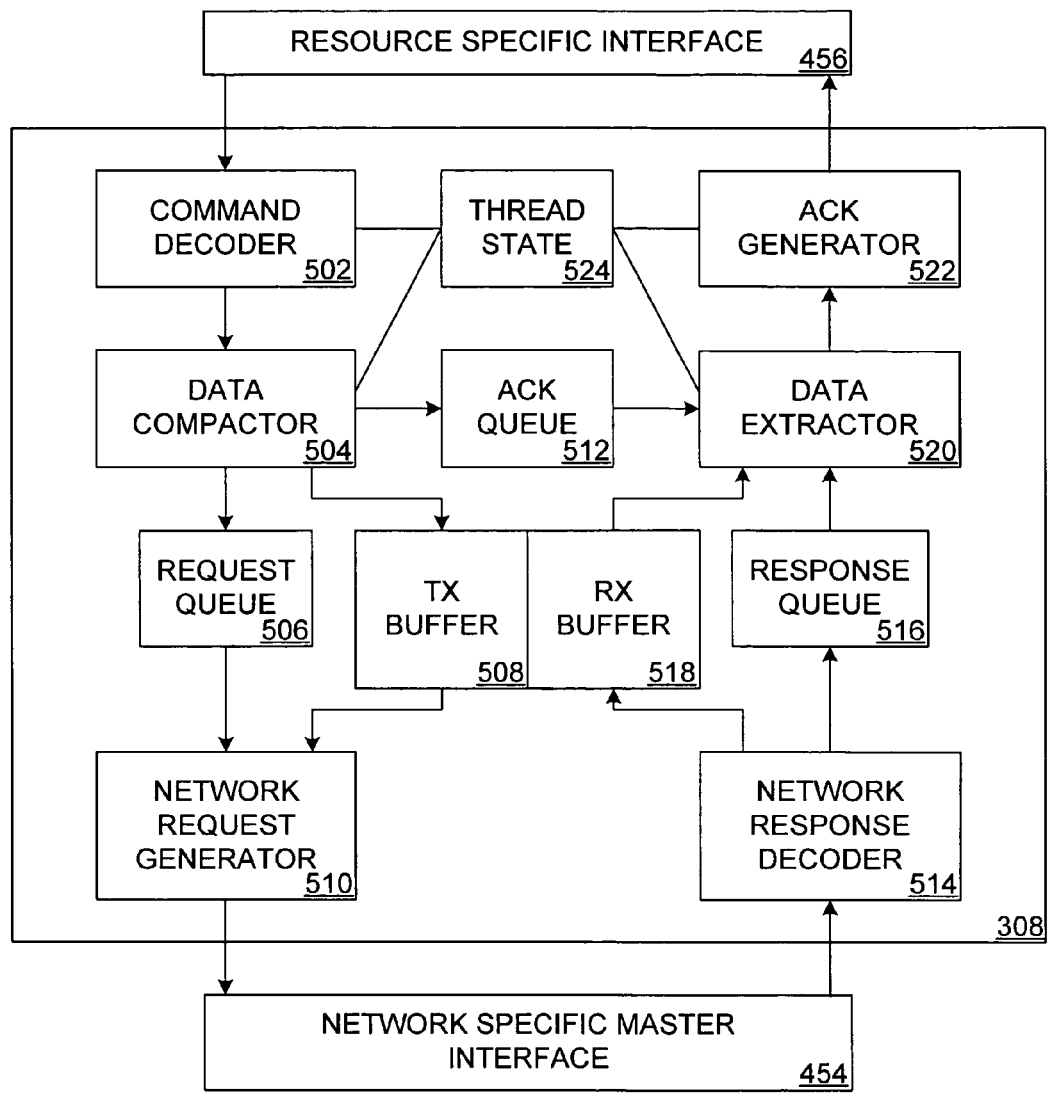
FIG. 5 illustrates an example marshalling/demarshalling engine in a wire engine for accelerating object-oriented communications according to one embodiment of this disclosure.

FIG. 5 illustrates an example marshalling/demarshalling engine 308 in a wire engine 206a for accelerating object-oriented communications according to one embodiment of this disclosure. The embodiment of the marshalling/demarshalling engine 308 shown in FIG. 5 is for illustration only. Other embodiments of the marshalling/demarshalling engine 308 may be used without departing from the scope of this disclosure. Also, for ease of explanation, the marshalling/demarshalling engine 308 is described as operating in the wire engine 206a of FIG. 4B. The marshalling/demarshalling engine 308 could be used in any other suitable environment.

In this example, the marshalling/demarshalling engine 308 includes a command decoder 502, a data compactor 504, a request queue 506, a transmit buffer 508, and a network request generator 510. The command decoder 502 receives requests from the processing resource (processor 102a) coupled to the wire engine 206a. The command decoder 502 decodes the requests, such as by identifying a service being requested and any associated parameters at the initiation of a remote object call. In some embodiments, the various processing resources in the processing system 100 may use different encoding schemes to encode the service and parameters, and the command decoder 502 decodes the requests for a particular encoding scheme. The command decoder 502 then provides this information to the data compactor 504.

The data compactor 504 compacts information from the command decoder 502 into blocks of data having a particular size. For example, the data compactor 504 could compact information from the command decoder 502 into packets having eight words. In particular embodiments, information from the command decoder 502 is placed in the same packet only if the information comes from the same thread executed by the processing resource.

The packetized data from the data compactor 504 is then placed in the request queue 506 and/or the transmit buffer 508. The request queue 506 stores the packetized data from the data compactor 504 until the data is retrieved by the network request generator 510. The transmit buffer 508 also stores packetized data from the data compactor 504 until the data is retrieved by the network request generator 510. In some embodiments, requests (such as a packet containing a remote object call) are placed in the request queue 506, and extra data (such as extra parameters that could not be placed in the remote object call packet) are placed in the transmit buffer 508.

The network request generator 510 uses the data in the request queue 506 and the transmit buffer 508 to generate a request suitable for transmission over the network 108. For example, the network request generator 510 may generate a request having a standard format, such as a packet having a suitably formatted header and properly formatted payload. As a particular example, the network request generator 510 could translate data representations from a processor-specific representation used by the processing resource to a network standard representation used by the network 108.

In particular embodiments, the network request generator 510 provides packets of data to the interface 454 of the wire engine 206a by performing write operations in an address space associated with the interface 454. Successful write operations result in acknowledgement messages being generated and stored in an acknowledgement queue 512. The acknowledgement messages are later retrieved and sent to the processing resource through the interface 454.

The messages generated by the network request generator 510 could have any suitable format. For example, each message may include a header and a payload. The header may encode the phase of a remote object call, a service identifier, a size of the payload, and a unique thread identifier. The identified phase could represent one of: the start of a client-invoked remote object call, the continuation of a client-invoked remote object call (used when one packet is not enough to transport all needed parameters), the start of a server-invoked remote object call, and the continuation of a server-invoked remote object call. The size of the payload in each packet may depend on various implementation factors, such as when different networks 108 have different optimal packet sizes.

Moreover, as described above, the object request broker 208 could perform functions in addition to brokering messages between objects. For example, the object request broker 208 could perform load balancing. The object request broker 208 could also support scheduling functions, such as by handling messages with higher priorities ahead of lower priority messages. In these embodiments, the messages transmitted by the network request generator 510 may include additional parameters. For example, the header in a message initiating a remote object call could include a priority associated with the request and a requested quality of service. Also, when a server object sends a message identifying the service(s) it provides to the object request broker 208, the network request generator 510 could include the expected execution time for the service, the expected power consumption for the service, and the expected jitter for the service.

In this example, the marshalling/demarshalling engine 308 also includes a network response decoder 514, a response queue 516, a receive buffer 518, a data extractor 520, and an acknowledgement generator 522. The network response decoder 514 receives messages, such as messages containing the results of a remote object call from the object request broker 208. The network response decoder 514 then decodes the messages. For example, the received messages may have a standard format suitable for transmission over the network 108, and the network response decoder 514 decodes the various information contained in the messages. As a particular example, the network response decoder 514 could translate data representations from a network standard representation used by the network 108 to a processor-specific representation used by the processing resource.

In particular embodiments, the network response decoder 514 retrieves packets of data from the interface 454 of the wire engine 206a by performing read operations in an address space associated with the interface 454. Successful read write operations result in acknowledgement messages being generated and sent to the processing resource through the interface 456.

Decoded information from the network response decoder 514 is stored in the response queue 516 and/or the receive buffer 518. In some embodiments, responses (such as responses to remote object calls) are placed in the response queue 516, and any additional response data that could not be placed in the initial response message is placed in the receive buffer 518. In some embodiments, the information stored in the response queue 516 and/or the receive buffer 518 is still formatted in packets, such as eight-word packets.

The data extract 520 retrieves the data placed in the response queue 516 and/or the receive buffer 518 and extracts the data from the packets. For example, the data may be contained in 8-word packets, and the data extract 520 extracts the data from these packets. The data extract 520 also retrieves data from the acknowledgement queue 512. The data extract 520 then provides the extracted data and the retrieved acknowledgement messages to the acknowledgement generator 522.

The acknowledgement generator 522 receives this data from the data extractor 520 and generates messages for the processing resource coupled to the wire engine 206a. For example, the acknowledgement generator 522 could generate acknowledgements indicating that read or write operations, corresponding to sending data over the network 108 and receiving data over the network 108, have completed successfully.

In this example, various components of the marshalling/demarshalling engine 308 have access to one or more thread states 524. The thread states 524 identify the current phase of a remote object call associated with each thread executed by the processing resource coupled to the wire engine 206a. For example, the thread states 524 could indicate that one thread is currently sending parameters to the wire engine 206a while another thread is not attempting to invoke a remote object. The various components of the marshalling/demarshalling engine 308 may use the thread states 524 in any suitable manner. As an example, the command decoder 502 could ensure that a thread is in an appropriate state before passing a message from that thread to the data compactor 504.

The thread states 524, the queues 506, 512, 516, and the buffers 508, 518 may represent any suitable memory arrangement. For example, various ones of these memory structures could represent the registers 302, 304 and the buffers 306a-306m of FIG. 3. Also, various ones of these memory structures could be combined or further subdivided according to particular needs.

Although FIG. 5 illustrates one example of a marshalling/demarshalling engine 308 in a wire engine 206a for accelerating object-oriented communications, various changes may be made to FIG. 5. For example, the functional division of FIG. 5 is for illustration only. Various components in FIG. 5 may be combined or omitted and additional components may be added according to particular needs.

Figure 6:
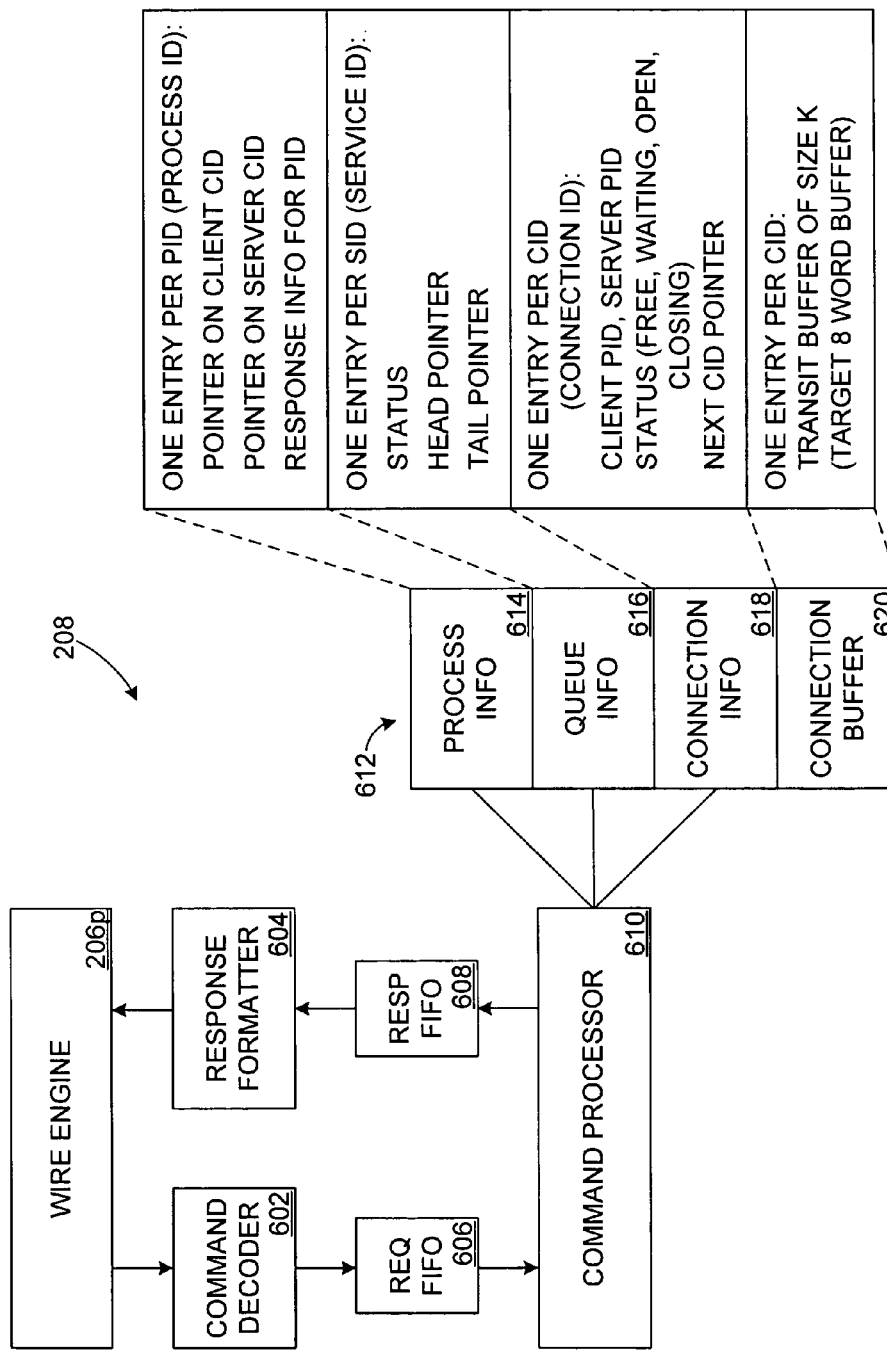
FIG. 6 illustrates an example object request broker for accelerating object-oriented communications according to one embodiment of this disclosure.

FIG. 6 illustrates an example object request broker 208 for accelerating object-oriented communications according to one embodiment of this disclosure. The embodiment of the object request broker 208 shown in FIG. 6 is for illustration only. Other embodiments of the object request broker 208 may be used without departing from the scope of this disclosure. Also, for ease of explanation, the object request broker 208 is described as operating in the processing system 100 of FIGS. 1 and 2. The object request broker 208 may be used in any other suitable environment.

In the illustrated example, the object request broker 208 includes a wire engine 206p. In this example, the wire engine 206p forms part of the object request broker 208. In other embodiments, the wire engine 206p resides outside of the object request broker 208.

A command decoder 602 and a response formatter 604 are coupled to the wire engine 206p. The command decoder 602 decodes messages received by the object request broker 208 so that requested operations may be performed by the object request broker 208. For example, the command decoder 602 may decode the message and identify a service requested by a particular client object. The command decoder 602 then provides this information for further processing by the object request broker 208. The response formatter 604 receives information to be sent to a client or server object and formats the information for communication over the network 108. For example, the response formatter 604 may receive results from the execution of a service, and the response formatter 604 may encode the results in a format suitable for communication over the network 108.

A request queue 606 and a response queue 608 are coupled to the command decoder 602 and the response formatter 604, respectively. The request queue 606 temporarily stores decoded requests until the requests may be further processed. The response queue 608 temporarily stores information to be sent to the client and server objects, such as the results from execution of a service, until the information may be retrieved and encoded by the response formatter 604.

A command processor 610 is coupled to the request queue 606 and the response queue 608. The command processor 610 is capable of processing messages from client and server objects and brokering the messages. For example, the command processor 610 could match a request for service from a client object with the service provided by a particular server object. The command processor 610 could then forward the request from the client object to the identified server object. Results from the execution of the service are received at the command processor 610, which then forwards the results to the client object.

A memory 612 is coupled to the command processor 610. The memory 612 stores various information used by the command processor 610 to perform the operations described above. In this example, the memory 612 is subdivided into four different sections 614-620. A process information section 614 stores information about the various threads being executed by the processing resources. For example, each thread may have a unique process identifier ("PID"), and the process information section 614 may contain an entry for each of these process identifiers. For each process identifier, the associated entry could include information such as a pointer to a client-side connection identifier ("CID"), a pointer to a server-side connection identifier, and response information. The connection identifiers identify the status of communications involving a client object and a server object for that particular thread. In some embodiments, the object request broker 208 treats communications between a client object and a server object as a connection to be monitored. The connection identifiers identify the specific connections involved in a remote object call. The response information in an entry of the process information section 614 represents the results from the execution of a service by a server object, where the results are to be provided to a thread.

A queue information section 616 stores requests for each service provided by the server objects in the processing system 100. For example, each service provided by one or more server objects could be requested multiple times, and requests for the same service are queued until each can be satisfied. The requests may be queued in any suitable manner, such as using a FIFO or priority-based queue. The queue information section 616 contains an entry for the each service's queue. For each entry, the queue information section 616 includes status information, a head pointer, and a tail pointer. The status information identifies the type of queue (FIFO, etc.) and the size (number of entries) currently in the queue. The head and tail pointers point to the beginning and end of a linked list that identifies the requests waiting to be satisfied.

A connection information section 618 stores information about the various connections between client and server objects. For each connection, an entry in the connection information section 618 identifies the client PID and the server PID of the objects associated with the connection. The entry also identifies the status of the connection, such as whether the connection is free, waiting for some event to occur, open and in use, or closing. Each entry in the connection information section 618 may further include a pointer to the next entry, which may be useful when the connection information section 618 is implemented as a linked list.

In addition, connection buffers 620 represent a transit buffer for each of the connections identified in the connection information section 618. The connection buffers 620 temporarily store data associated with each of the connections. The connection buffers 620 may have any suitable size(s), such as an eight-word size.

In some embodiments, all of the various components shown in FIG. 6 may be implemented in hardware. For example, the components could be implemented using Sea of Gates structures. Also, the memory 612 may represent any suitable amount of memory. The amount of memory 612 could, for example, be based on the expected number of process identifiers, the expected number of service identifiers, the expected number of connection identifiers, and the size of the connection buffers 620. In addition, the memory 612 could represent or be associated with the queues 210-214 shown in FIG. 2.

Although FIG. 6 illustrates one example of a object request broker 208 for accelerating object-oriented communications, various changes may be made to FIG. 6. For example, while FIG. 6 illustrates the memory 612 as a single memory structure, the memory 612 could also represent any number of separate memories. Also, the functional division of FIG. 6 is for illustration only. Various components in FIG. 6 may be combined or omitted and additional components may be added according to particular needs.

Figure 7:
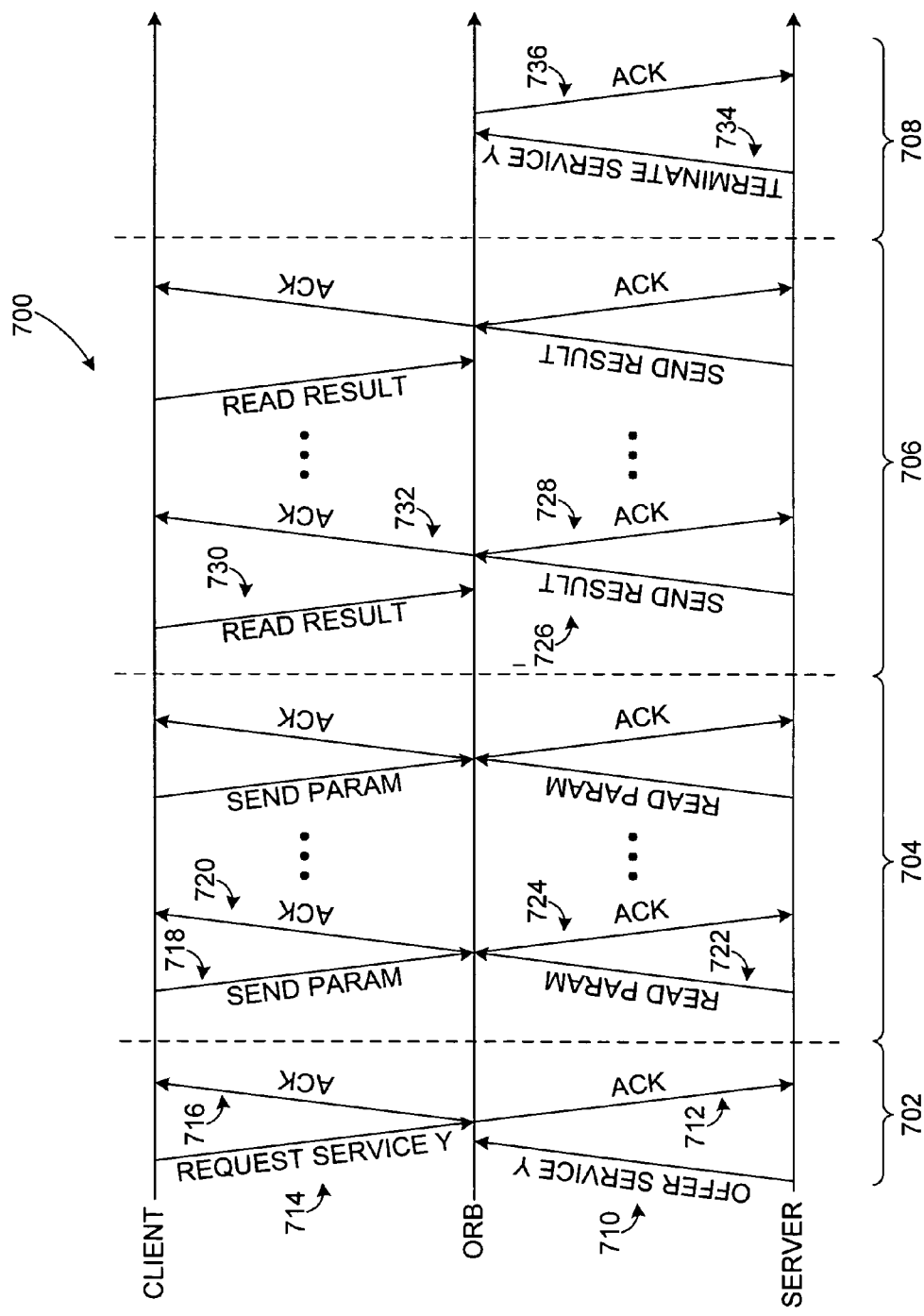
FIG. 7 illustrates an example communication flow for performing a remote object call according to one embodiment of this disclosure.

FIG. 7 illustrates an example communication flow 700 for performing a remote object call according to one embodiment of this disclosure. For ease of explanation, the communication flow 700 is described with respect to the processing system 100 shown in FIGS. 1 and 2. The communication flow 700 could be used in any other suitable system.

As shown in FIG. 7, the communication flow 700 is divided into multiple stages or phases 702-708. These phases 702-708 represent the general phases of a remote object call. In this example, an opening or initial phase 702 represents the phase where a server object informs the object request broker ("ORB") 208 of a service offered by the server object. The server object communicates an offer service message 710 to the object request broker 208. The offer service message 710 identifies the service and any parameters associated with the service. The object request broker 208 acknowledges the message 710 with an acknowledgement 712.

At some point, a client object may request the service by communicating a request service message 714 to the object request broker 208. The request service message 714 identifies the requested service, such as by using a unique numerical identifier associated with the requested service. The request service message 714 may also contain parameters for the requested service. An acknowledgement message 716 may be returned to the client object by the object request broker 208. In some embodiments, the acknowledgement message 712 is sent to the server object after the client object requests the service. In particular embodiments, the acknowledgement message 712 contains at least some of the parameters for the requested service contained in the request service message 714.

In particular embodiments, the request service message 714 is implemented as a write operation to an address corresponding to the requested service. Also, the offer service message 710 is implemented as a read operation to the same address. The one or more values written to and read from this address represent part or all the parameters needed for the requested service. The read operation could be blocked until at least one client object writes a value to the particular address (which-could occur before the offer service message 710). The write operation from the client object need not be blocked. This allows, for example, the offer service message 710 and the request service message 714 to be received in any order.

A parameter-passing phase 704 represents an optional phase where additional parameters are passed between the client and server objects. The parameter-passing phase 704 may be useful, for example, when all of the parameters required for the requested service are not or cannot be passed during the opening phase 702. In this example, the client object communicates one or more send parameter messages 718 to the object request broker 208 and receives acknowledgement messages 720 from the object request broker 208. Similarly, the server object retrieves the parameters using one or more read parameter messages 722 and receives acknowledgement messages 724 from the object request broker 208.

In particular embodiments, the transmission of parameter values by the client object are implemented as one or more write operations. Also, the reception of the parameter values by the server object is implemented as one or more read operations. Again, the write operations from the client object need not be blocked, while the read operations from the server object may be blocked until the client object performs a write operation. Once again, this allows the send parameter messages 718 and the read parameter messages 722 to be received in any order.

A result-passing phase 706 represents an optional phase used when the server object needs to return results to the client object after the execution of a service. In this example, the server object communicates one or more send result messages 726 to the object request broker 208 and receives acknowledgement messages 728 from the object request broker 208. Similarly, the client object retrieves the results using one or more read result messages 730 and receives acknowledgement messages 732 from the object request broker 208.

In particular embodiments, the transmission of the results by the server object is implemented as one or more write operations, and the reception by the client object is implemented as one or more read operations. In this case, the read operations by the client object may be blocked until the results are written by the server object. The write operations by the server object need not be blocked.

A closing phase 708 represents the termination of a remote object call. In some embodiments, the closing phase 708 involves only the server object involved in the remote object call. The client object involved in the remote object call may view the call as being complete when the final result value is retrieved. In this phase 708, the server object communicates a terminate service message 734 to the object request broker 208 and receives an acknowledgement message 736. In some embodiments, the termination message 734 is implemented as a write operation by the server object. In particular embodiments, the termination message 734 may be combined with the last write operation used to return the final result value(s) to the client object (the final send result message 726). In other embodiments, the termination message 734 may be implemented as a read operation and combined with a new offer service message 710 since the server object is probably available to serve another client object.

In some embodiments, as shown in this example, the client and server objects do not need to perform any synchronization functions. In these embodiments, the synchronization of the client and server objects is performed by the object request broker 208. For example, read operations may be blocked until write operations that provide needed data occur. This helps to simplify the operation of the client and server objects.

Although FIG. 7 illustrates one example of a communication flow 700 for performing a remote object call, various changes may be made to FIG. 7. For example, the use of acknowledgement messages may be optional in the processing system 100. Also, various phases (such as phase 704 and/or phase 706) may be optional. In addition, the object request broker 208 may only be involved in establishing an initial connection between client and server objects. The phases 704-706 may then occur between the client and server objects without passing through the object request broker 208.

Figure 8:
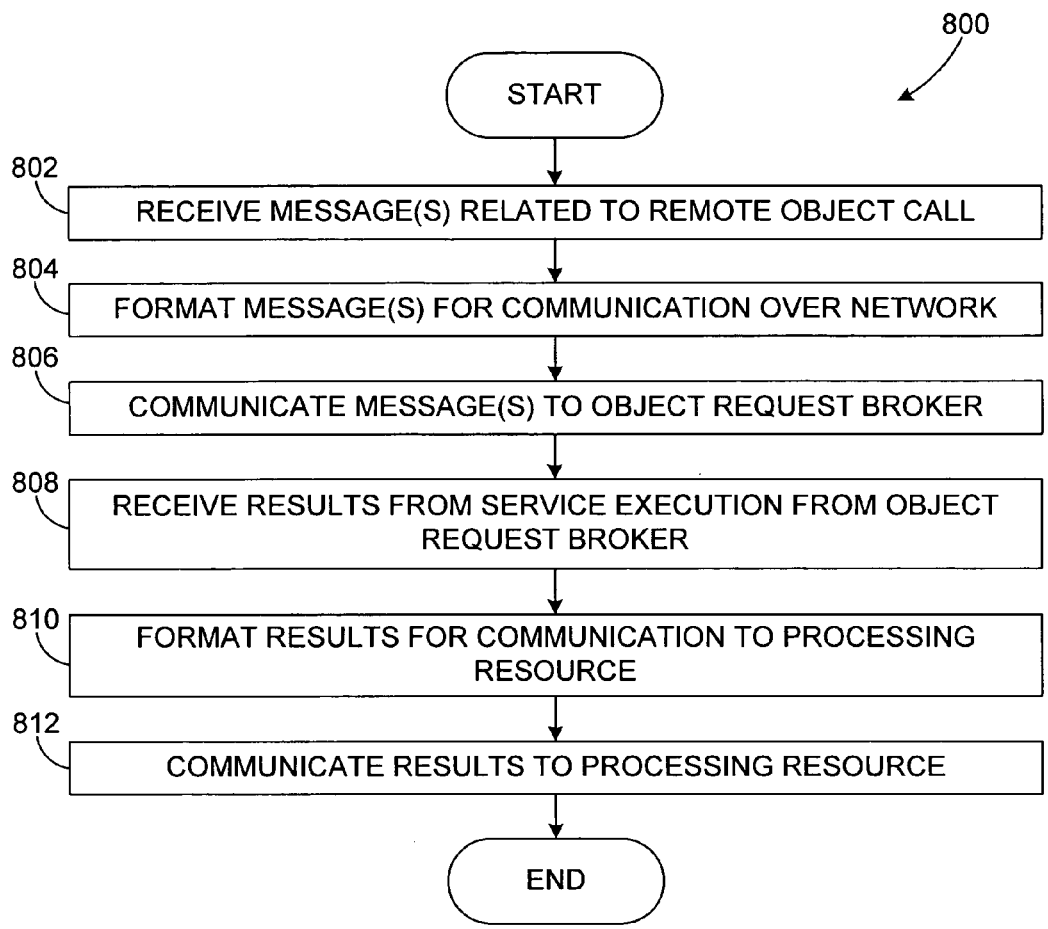
FIG. 8 illustrates an example method for accelerating object-oriented communications at a wire engine according to one embodiment of this disclosure.

FIG. 8 illustrates an example method 800 for accelerating object-oriented communications at a wire engine according to one embodiment of this disclosure. For ease of explanation, the method 800 is described with respect to the wire engine 206a of FIG. 4B operating in the processing system 100 of FIGS. 1 and 2. The method 800 could be used by any other suitable device and in any other suitable system.

The wire engine 206a receives one or more messages associated with a remote object call at step 802. This may include, for example, the processor 102a coupled to the wire engine 206a providing a message encoding a requested service. The message could also include one or more parameters. The message is received by the wire engine 206a through the resource specific interface 456.

The wire engine 206a formats one or more messages for communication over the network 108 at step 804. This may include, for example, the marshalling/demarshalling engine 308 reformatting the received message(s) into the appropriate format or generating new message(s) having the appropriate format. The format could include, for example, packets having a header with a standard format and a payload with a standard size. This may also include the marshalling/demarshalling engine 308 translating data representations from a processor-specific representation to a network standard representation.

The wire engine 206a communicates the message(s) to the object request broker 208 at step 806. This may include, for example, the marshalling/demarshalling engine 308 communicating the formatted message(s) to the network specific master interface 454 for communication over the network 108. As a particular example, this may include the wire engine 206a communicating multiple messages to the object request broker 208, including a request service message 714 and possibly one or more send parameter messages 718.

The wire engine 206a receives results from the execution of the service from the object request broker 208 at step 808. This may include, for example, the marshalling/demarshalling engine 308 receiving messages containing the results of the service execution over the network 108 through the network specific master interface 454. As a particular example, this may include the wire engine 206a communicating one or more read result messages 730 to the object request broker 208 and receiving responses from the object request broker 208.

The wire engine 206a formats the results for communication to the processing resource (processor 102a) at step 810. This may include, for example, the marshalling/demarshalling engine 308 translating data representations from a network standard representation to a processor-specific representation. This may also include the marshalling/demarshalling engine 308 placing the data in a format suitable for use by the processor 102a, such as by removing the data from packets.

The wire engine 206a communicates the results to the processing resource at step 812. This may include, for example, the marshalling/demarshalling engine 308 communicating the formatted results to the processor 102a through the resource specific interface 456.

In this way, a client object requesting service from a remote object need not be concerned with how the request should be formatted or where the remote object is located. Also, the hardware used to implement the wire engine 206a and the object request broker 208 may operate faster than software applications, which may help to increase the speed at which the remote object calls are performed.

Although FIG. 8 illustrates one example of a method 800 for accelerating object-oriented communications at a wire engine, various changes may be made to FIG. 8. For example, the same or similar method could be used by the wire engine 206o coupled to a hardware processing engine 112, 114. Also, various steps in the method 800 could be omitted. As a particular example, a requested service may not return any results, and steps 808-812 could be skipped.

Figure 9:
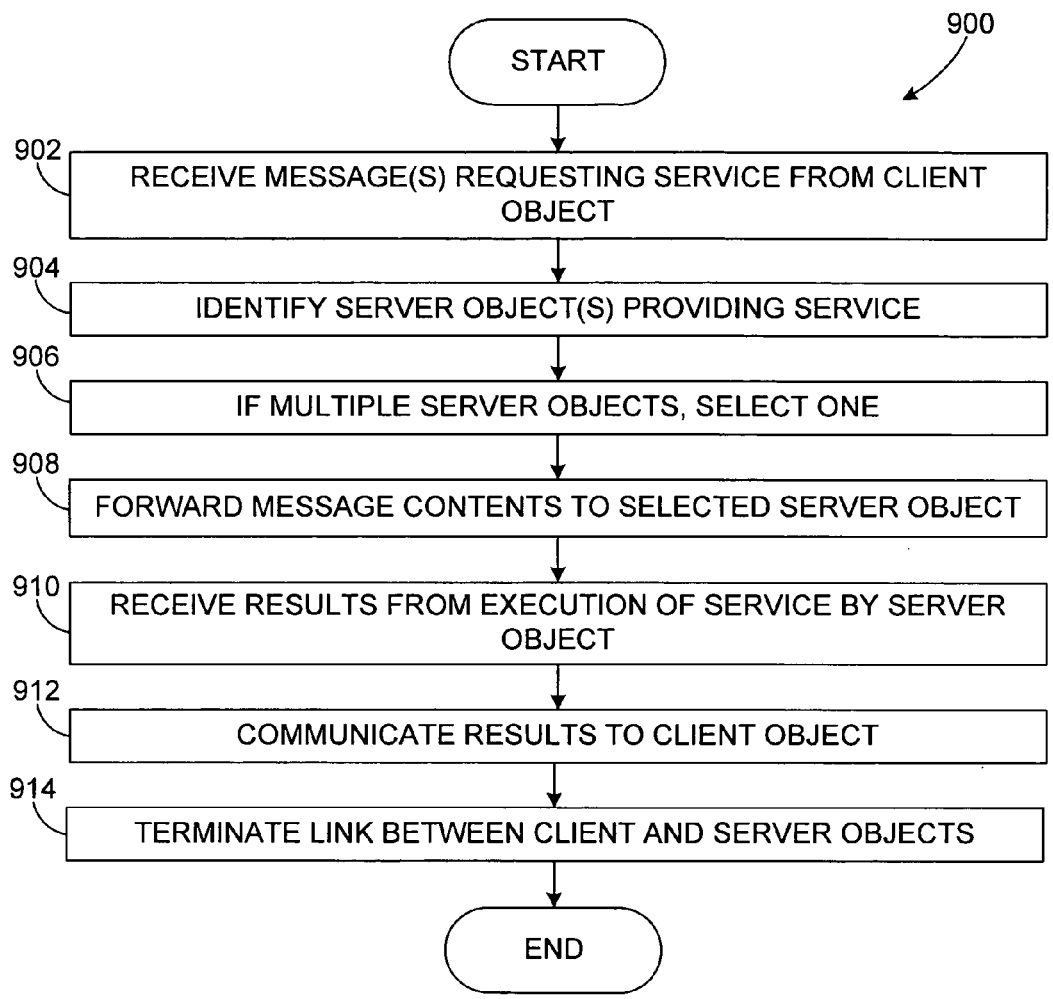
FIG. 9 illustrates an example method for accelerating object-oriented communications at an object request broker according to one embodiment of this disclosure.

FIG. 9 illustrates an example method 900 for accelerating object-oriented communications at an object request broker 208 according to one embodiment of this disclosure. For ease of explanation, the method 900 is described with respect to the object request broker 208 of FIG. 6 operating in the processing system 100 of FIGS. 1 and 2. The method 900 could be used by any other suitable device and in any other suitable system.

The object request broker 208 receives one or more messages requesting a service from a client object at step 902. This may include, for example, the wire engine 206p receiving the message(s) from another wire engine. This may also include the command decoder 602 decoding the service identifier contained in the message(s), where the service identifier identifies the requested service. As a particular example, the message(s) could represent a request service message 714 and possibly one or more send parameter messages 718.

The object request broker 208 identifies one or more server objects that provide the requested service at step 904. This may include, for example, the command processor 610 using the information in the server queues 212 to identify any server objects that provide the requested service.

If multiple server objects could provide the requested service, the object request broker 208 selects one of the server objects at step 906. This may include, for example, the object request broker 208 using a first-in, first-out approach by selecting the first server object listed in the service's server queue 212. This may also include the object request broker 208 selecting the server object with the lowest load. In this way, the object request broker 208 performs load balancing to balance the load on the server objects. This may further include the object request broker 208 performing other system-level optimizations, including optimizing usage of the network 108, scheduling for real-time response, and ensuring quality of service.

The object request broker 208 forwards the contents of the one or more messages from the client object to the selected server object at step 908. This may include, for example, the wire engine 206p communicating the contents over the network 108 to a wire engine that is coupled to the processing resource implementing the selected server object. As a particular example, this may include the object request broker 208 communicating the contents in the acknowledgement message 712 and possibly one or more acknowledgement messages 724.

The object request broker 208 receives results from the execution of the service by the selected server object at step 910. This may include, for example, the wire engine 206p of the object request broker 208 receiving one or more messages containing the results. This may also include the object request broker 208 processing the messages and identifying the client object to receive the messages. As a particular example, this may include the object request broker 208 receiving one or more send result messages 726.

The object request broker 208 communicates the results to the client object at step 912. This may include, for example, the object request broker 208 communicating the results to the wire engine coupled to the processing resource implementing the client object. As a particular example, this may include the object request broker 208 receiving one or more read result messages 730 and transmitting one or more acknowledgement messages 732.

The object request broker 208 terminates the connection between the client and server objects at step 914. This may include, for example, the object request broker 208 receiving a terminate service message 734 from the server object.

In this way, client objects requesting service need not be concerned with identifying the specific server objects to provide the service. Also, the same service can be provided by multiple server objects in a group or server farm, allowing requests for service to be routed to appropriate server objects based on conditions in the system 100 (such as network congestion, real-time constraints, and quality of service requirements). In addition, the hardware used to implement the object request broker 208 may operate faster than software applications, which may help to increase the speed at which the remote object calls are performed.

Although FIG. 9 illustrates one example of a method 900 for accelerating object-oriented communications at an object request broker 208, various changes may be made to FIG. 9. For example, various steps in the method 900 could be omitted. As a particular example, a requested service may not return any results, and steps 910-912 could be skipped.

Figure 10:
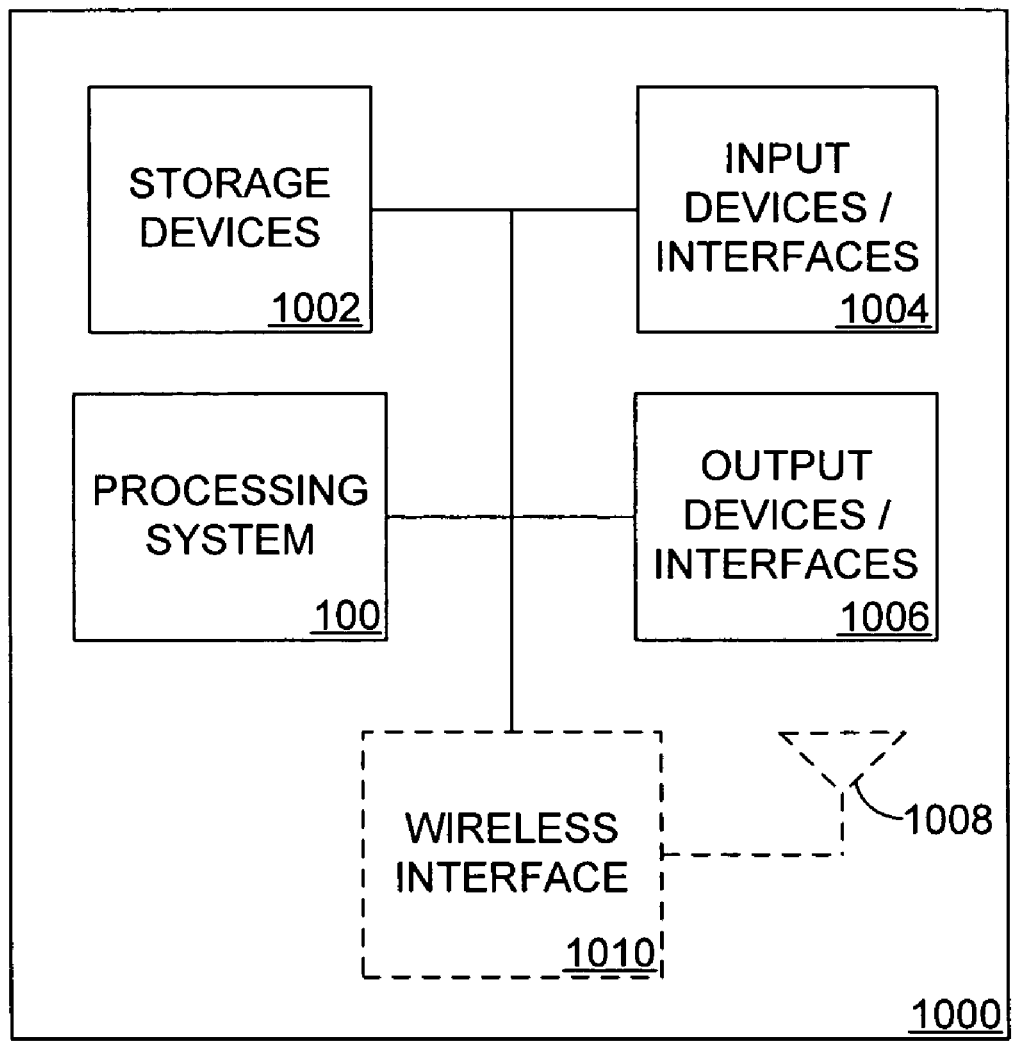
FIG. 10 illustrates an example apparatus using a processing system that accelerates object-oriented communications according to one embodiment of this disclosure.

FIG. 10 illustrates an example apparatus 1000 using a processing system 100 that accelerates object-oriented communications according to one embodiment of this disclosure. The apparatus 1000 shown in FIG. 10 represents one operational environment in which the processing system 100 may be used. The processing system 100 may be used in any other suitable environment without departing from the scope of this disclosure.

As shown in FIG. 10, the processing system 100 is coupled to one or more storage devices 1002, one or more input devices and/or input device interfaces 1004, and one or more output devices and/or output device interfaces 1006. The storage devices 1002 represent any suitable mechanism or mechanisms for storing and facilitating retrieval of information. For example, the storage devices 1002 could represent read only memories, random access memories, hard disk drives, CD drives, DVD drives, and any other or additional storage devices.

The input devices and/or interfaces 1004 represent any suitable input device(s) and/or interface(s) to input devices. For example, the input devices/interfaces 1004 could represent a keyboard, mouse, light pen, and/or other input device or interface to such a device.

The output devices and/or interfaces 1006 represent any suitable output device(s) and/or interface(s) to output devices. For example, the output devices/interfaces 1006 could represent a monitor, printer, scanner, and/or other output device or interface to such a device.

In this example, the apparatus 1000 may be capable of transmitting and/or receiving wireless signals. To support this functionality, the apparatus 1000 may optionally include an antenna 1008 and wireless interface circuitry 1010. The antenna 1008 represents any suitable structure capable of transmitting and/or receiving wireless signals, such as a radio frequency ("RF") antenna. The wireless interface circuitry 1010 represents any suitable circuitry capable of facilitating communication using wireless signals. For example, the wireless interface circuitry 1010 could modulate data for transmission over RF signals and demodulate received RF signals to extract data for processing. The wireless interface circuitry 1010 could, for example, represent an RF transceiver.

The apparatus 1000 of FIG. 10 could represent any suitable device or system that is capable of using the processing system 100. For example, the apparatus 1000 could represent a mobile telephone. In this example, the antenna 1008 and wireless interface 1010 are used to facilitate communication between the mobile telephone and a base station or other structure. The input devices/interfaces 1004 could represent a keypad on the mobile telephone and a microphone capable of capturing audible sounds. The output devices/interfaces 1006 could represent a display on the mobile telephone and a speaker capable of producing audible sounds. In addition, the storage devices 1002 could represent memory and/or a smart card capable of storing information such as telephone numbers, a call log, and any other or additional information.

As another example, the apparatus 1000 could represent a computing device, such as a networking device. In this example, the input devices/interfaces 1004 and the output devices/interfaces 1006 could represent ports that couple the apparatus 1000 to one or more networks. The antenna 1008 and wireless interface 1010 could be omitted in this example. The apparatus 1000 could implement any of a wide variety of functions, such as packet forwarding and traffic management in a network.

Although FIG. 10 illustrates one example of an apparatus 1000 using a processing system that accelerates object-oriented communications, various changes may be made to FIG. 10. For example, the processing system 100 could be used in any other suitable device or system.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A processing system, comprising:
   a plurality of processing resources executing a plurality of objects using at least one processor, the plurality of objects comprising a client object and one or more server objects, the client object configured to request a service provided by at least one of the one or more server objects;
   at least one hardware engine configured to receive a request for the service from the processing resource executing the client object;
   a first wire engine coupled the processing resource executing the client object, wherein the first wire engine comprises a processing resource specific interface and is configured to format one or more messages associated with the requested service; and
   a second wire engine comprising a second network specific interface configured to operate in slave mode and a read/write interface that is configured to receive one or more messages from the hardware engine and to communicate the one or more messages to the processing resource executing at least one of the one or more server objects that provides the requested service,
   wherein the at least one hardware engine includes a formatter configured to format the one or more messages,
   wherein the one or more messages identify the type of service requested and parameters for the requested service, wherein the parameters for the requested service comprise information related to the execution of the service, and
   wherein the first and second wire engines are each configured to manage at least one network interface coupled to the at least one hardware engine, block unwanted communication from reaching the one or more server objects until at least one write operation is performed, and perform an arbitration function on at least one thread that is attempting to perform a call to a remote object.

2. The processing system of claim 1, wherein the at least one hardware engine receives one or more second messages containing results from execution of the requested service and providing the results to the processing resource executing the client object.

3. The processing system of claim 1, wherein the at least one hardware engine comprises memory locations corresponding to a plurality of data types used by at least one of the processing resources.

4. The processing system of claim 3, wherein a read/write operation by one of the processing resources involving one of the memory locations results in at least one of:
   converting data to or from a network standard representation;
   halting a thread executed by one of the processing resources by stalling the read/write operation until the requested service is available and is capable of being provided to the client object; indicating that the requested service cannot be provided, wherein the indication is provided by at least one exception or at least one interrupt; and
   placing data into or removing data from at least one packet, the at least one packet transmitted or received over a network.

5. The processing system of claim 3, wherein the memory locations comprise at least one of:
   memory-mapped locations into an address space of at least one of the processing resources; and
   registers defined in an instruction set architecture of at least one of the processing resources.

6. The processing system of claim 1, wherein the at least one hardware engine comprises a first hardware engine communicating the one or more messages to an object request broker, the object request broker communicating the one or more messages to the processing resource executing at least one of the one or more server objects.

7. The processing system of claim 6, further comprising a second hardware engine coupled to the object request broker, wherein the first hardware engine communicating the one or more messages by communicating the one or more messages to the second hardware engine.

8. The processing system of claim 7, wherein the first hardware engine comprises a processing resource specific interface, a formatter formatting the one or more messages, and a first network specific interface, and the second hardware engine comprises a second network specific interface and a read/write interface.

9. The processing system of claim 8, wherein the first network specific interface is operating in master mode, and the second network specific interface is operating in slave mode.

10. The processing system of claim 8, wherein the formatter comprises:
    a command decoder decoding the request;
    a data compactor placing decoded information into one or more packets;
    a network request generator generating the one or more messages using the one or more packets;
    a network response decoder decoding result information associated with the requested service contained in one or more packets;
    a data extractor extracting the result information from the one or more packets; and
    an acknowledgement generator providing the result information to the processing resource executing the client object.

11. The processing system of claim 1, wherein at least one of the processing resources is executing a plurality of threads, and the at least one hardware engine comprises a plurality of buffers associated with each of the threads.

12. The processing system of claim 1, wherein the parameters include a power usage for the service.

13. The processing system of claim 1, further comprising:
    at least one memory;
    at least one programmable hardware processing engine;
    at least one interface to an external device; and
    a network coupling the processing resources, the at least one hardware engine, the memory, the programmable hardware processing engine, and the interface.

14. A method, comprising:
executing a plurality of objects at a plurality of processing resources, the objects comprising a client object and one or more server objects, the client object capable of requesting a service provided by at least one of the one or more server objects;
providing a request for the service from the processing resource executing the client object to a hardware engine;
formatting one or more messages associated with the requested service using a first wire engine coupled the processing resource executing the client object, wherein the first wire engine comprises a processing resource specific interface and is configured to format the one or more messages for the hardware engine; and
communicating the one or more messages to the processing resource executing at least one of the one or more server objects that provides the requested service using a second wire engine comprising a second network specific interface configured to operate in slave mode and a read/write interface that is adapted to receive one or more messages from the hardware engine,
wherein the at least one hardware engine includes a formatter configured to format the one or more messages,
wherein the one or more messages identify the type of service requested and parameters for the requested service, wherein the parameters for the requested service comprise information related to the execution of the service, and
wherein the first and second wire engines are each configured to manage buffers and control at least one network interface during communication and block unwanted communication from reaching the command decoder and perform an arbitration function on at least one thread that is attempting to perform a call to a remote object until at least one write operation is performed.

15. The method of claim 14, further comprising:
receiving one or more second messages containing results from execution of the requested service at the hardware engine; and
providing the results to the processing resource executing the client object.

16. The method of claim 14, wherein the at least one hardware engine comprises memory locations corresponding to a plurality of data types used by at least one of the processing resources.

17. The method of claim 16, wherein a read/write operation by one of the processing resources involving one of the memory locations results in at least one of:
converting data to or from a network standard representation;
halting a thread executed by one of the processing resources by stalling the read/write operation until the requested service is available and is being provided to the client object;
generating at least one of an exception and an interrupt indicating that the requested service cannot be provided; and
placing data into or removing data from at least one packet, the at least one packet transmitted or received over a network.

18. The method of claim 16, wherein the memory locations comprise at least one of:
memory-mapped locations into an address space of at least one of the processing resources; and
registers defined in an instruction set architecture of at least one of the processing resources.

19. The method of claim 14, wherein communicating the one or more messages comprises communicating the one or more messages to an object request broker, the object request broker communicating the one or more messages to the processing resource executing at least one of the one or more server objects.

20. The method of claim 19, wherein communicating the one or more messages to the object request broker comprises communicating the one or more messages to a second hardware engine coupled to the object request broker.

21. The method of claim 20, wherein the hardware engine comprises a processing resource specific interface, a formatter formatting the one or more messages, and a first network specific interface, and the second hardware engine comprises a second network specific interface and a read/write interface.

22. The method of claim 21, wherein the first network specific interface is operating in master mode, and the second network specific interface is operating in slave mode.

23. The method of claim 21, wherein the formatter comprises:
a command decoder decoding the request;
a data compactor placing decoded information into one or more packets;
a network request generator generating the one or more messages using the one or more packets;
a network response decoder decoding result information associated with the requested service contained in one or more packets;
a data extractor extracting the result information from the one or more packets; and
an acknowledgement generator providing the result information to the processing resource executing the client object.

24. The method of claim 14, wherein the hardware engine is integrated into the processing resource executing the client object.

25. The method of claim 14, wherein the parameters include a standard deviation time required to execute the service.

26. An apparatus, comprising:
at least one of: an input device and an interface to the input device, the input device configured to provide input data;
at least one of: an output device and an interface to the output device, the output device configured to receive output data; and
a processing system configured to receive the input data and configured to generate the output data, the processing system comprising:
a plurality of processing resources configured to execute a plurality of objects using at least one processor, the objects comprising a client object and one or more server objects, the client object configured to request a service provided by at least one of the one or more server objects; and
at least one hardware engine configured to receive a request from the client object for the service;
a first wire engine coupled the processing resource executing the client object, wherein the first wire engine comprises a processing resource specific interface and is configured to format one or more messages associated with the requested service; and
a second wire engine comprising a second network specific interface configured to operate in slave mode and a read/write interface that is configured to receive one or more messages from the hardware engine and to communicate the one or more messages to the processing resource executing at least one of the one or more server objects that provides the requested service, wherein the at least one hardware engine includes a formatter configured to format the one or more messages, wherein the one or more messages identify the type of service requested and parameters for the requested service, wherein the parameters for the requested service comprise information related to the execution of the service, and wherein the first and second wire engines are each configured to manage buffers and control at least one network interface during communication, block unwanted communication from reaching the hardware engine until at least one write operation is performed, and perform an arbitration function on at least one thread that is attempting to perform a call to a remote object.

27. The apparatus of claim 26, wherein the at least one hardware engine comprises:
   a command decoder decoding the request from the client object;
   a data compactor placing decoded information into one or more packets; and
   a network request generator generating the one or more messages using the one or more packets.

28. The apparatus of claim 27, wherein the at least one hardware engine further comprises:
   a network response decoder decoding result information associated with the requested service contained in one or more packets;
   a data extractor extracting the result information from the one or more packets; and
   an acknowledgement generator providing the result information to the processing resource executing the client object.

29. The apparatus of claim 26, wherein the apparatus comprises a mobile telephone, at least one of an input device and an interface to the input device comprises a keypad and a microphone, and at least one of an output device and an interface to the output device comprises a display and a speaker.

30. The apparatus of claim 26, further comprising:
   an antenna at least one of: receiving wireless signals and transmitting wireless signals; and a wireless interface converting received signals into data suitable for processing and of converting data into signals suitable for transmission.

31. The apparatus of claim 26, wherein the apparatus is coupled to a network, and the processing system is performing at least one of packet forwarding and traffic management.

* * * * *